(12) United States Patent
Bultan et al.

(10) Patent No.: US 7,010,020 B2
(45) Date of Patent: Mar. 7, 2006

(54) CODE TRACKING LOOP WITH AUTOMATIC POWER NORMALIZATION

(75) Inventors: Aykut Bultan, Bayside, NY (US); Donald Grieco, Manhassett, NY (US)

(73) Assignee: InterDigital Technology Corp, Wilmington, DE (US)

(*) Notice: Subject to any disclaimer, the term of this patent is extended or adjusted under 35 U.S.C. 154(b) by 266 days.

(21) Appl. No.: 10/686,057

(22) Filed: Oct. 14, 2003

(65) Prior Publication Data

US 2004/0057506 A1  Mar. 25, 2004

Related U.S. Application Data

(63) Continuation of application No. 10/252,640, filed on Sep. 23, 2002, now Pat. No. 6,633,603, which is a continuation of application No. 10/034,867, filed on Dec. 27, 2001, now Pat. No. 6,456,648.

(60) Provisional application No. 60/326,308, filed on Oct. 1, 2001.

(51) Int. Cl.
*H04B 1/707* (2006.01)

(52) U.S. Cl. ................ 375/148; 375/149; 375/150; 375/343

(58) Field of Classification Search ........ 375/142–145, 375/148–150, 152, 343; 370/320, 335, 342, 370/441

See application file for complete search history.

(56) References Cited

U.S. PATENT DOCUMENTS

| 5,579,345 | A | * | 11/1996 | Kroeger et al. ............. 375/344 |
| 5,654,980 | A | * | 8/1997 | Latva-aho et al. .......... 375/148 |
| 5,659,573 | A | | 8/1997 | Bruckert et al. |
| 5,737,362 | A | | 4/1998 | Hyun et al. |
| 5,768,323 | A | | 6/1998 | Kroeger et al. |
| 5,809,064 | A | * | 9/1998 | Fenton et al. ............... 375/150 |
| 5,832,023 | A | | 11/1998 | Latva-aho |
| 6,201,828 | B1 | | 3/2001 | El-Tarhuni et al. |
| 6,205,167 | B1 | | 3/2001 | Kamgar et al. |
| 6,483,867 | B1 | * | 11/2002 | Mannermaa ................ 375/149 |

FOREIGN PATENT DOCUMENTS

GB  2 349 555  11/2000

OTHER PUBLICATIONS

Floyd M. Gardner, Interpolation in Digital Modems-Part I; Fundamentals IEEE, Transactions on Communications, vol. 41, No. 3, pp. 501-507, Mar. 1993.

(Continued)

*Primary Examiner*—Don N. Vo
(74) *Attorney, Agent, or Firm*—Volpe & Koenig, P.C.

(57) ABSTRACT

The present invention is for a receiver incorporated into User Equipment (UE) or base stations of a code division multiple access (CDMA) communication system. The UE and base station are in communication with one of the plurality of base stations and receives a communication signal through the receiver. The communication signal is correlated using a delay locked code tracking loop, that estimates and tracks a channel delay. The tracking loop comprises a reference code generator and an interpolator for generating timed signal versions in response to said communication. A timed signal correlator, included in the tracking loop for correlating at least two of the timed signal versions with the code reference signal. The result of the correlation is used for generating an error signal. An automatic power normalization loop (APN), that is responsive to the interpolator, generates a power error signal that normalizes the error signal through a normalization circuit.

8 Claims, 3 Drawing Sheets

OTHER PUBLICATIONS

Gardner et al., Interpolation in Digital Modems-Part II: Implementation and Perfromance, IEEE Transactions on Communications, vol. 41, No. 6, pp. 998-1008, Jun. 1993.

Lim et al., Analysis of Decimator-Based Full Digital Delay-Locked PN Code Tracking Loops for Bandlimited Direct-Sequence Spread-Spectrum Signals in AWGN, IEICE Transactions on Communications, vol. E00-A, No. 1, Jan. 1998.

3 GPP TSG RAN, UE Radio Transmission and Reception (FDD), 3G TS 25.101, V3.2.0, Mar. 2000.

Latva-aho et al., Quasi-Coherent Delay-Locked Loops for Fading Channels.

Jack K. Holmes, Coherent Spread Spectrum Systems, John Wiley and Sons Inc., pp. 475-481 and pp. 80-81, New York, 1982.

Su et al., Performance of Combined DDLL and AGC Loop for Direct-Sequence Spread Systems, IEEE Transactions on Communications, vol. 48, No. 9, pp. 1455-1458, Sep. 2000.

Kim, "Pseudonoise Code Tracking Loop for a CDMA System with Imperfect Power Control", International Journal of Communication Systems, vol. 14, No. 4, May 1, 2001, pp. 419-430.

* cited by examiner

CODE TRACKING LOOP WITH AUTOMATIC POWER NORMALIZATION

CROSS REFERENCE TO RELATED APPLICATIONS

The application is a continuation of U.S. patent application Ser. No. 10/252,640, filed Sep. 23, 2002, now U.S. Pat. No. 6,633,603 which is a continuation of U.S. patent application Ser. No. 10/034,867, filed Dec. 27, 2001, now U.S. Pat. No. 6,456,648, issued Sep. 24, 2002, which claims priority from U.S. Provisional Patent Application No. 60/326,308, filed Oct. 1, 2001.

BACKGROUND

The present invention relates to a code tracking system for a receiver of a code division multiple access (CDMA) communication system. More specifically, the present invention relates to a second order code tracking system for more effectively removing the timing difference between the transmitted code and the received code.

Synchronization is an important task in any kind of telecommunication. There are several levels of synchronization, such as, carrier, frequency, code, symbol, frame and network synchronization. In all these levels, synchronization can be distinguished into two phases, which are acquisition (initial synchronization) and tracking (fine synchronization).

A typical wireless communication system sends downlink communications from a base station to one or a plurality of User Equipments (UEs) and uplink communications from UEs to the base station. A receiver within the UE works by correlating, or despreading, the received downlink signal with a known code sequence. The sequence must be exactly synchronized to the received sequence in order to get the maximal output from the correlator. The receiver should be able to easily adapt to a change in the environment of a radio line changing without ceasing operation. In order to accomplish this, present receivers gather as much of the transmitted signal energy as possible in order to maximize the signal-to-noise ratio. In multi-path fading channels, however, the signal energy is dispersed over a certain amount of time due to distinct echo paths and scattering. One crucial task of the receiver is thus to estimate the channel to improve its performance. If the receiver has information about the channel profile, one way of gathering signal energy is then to assign several correlator branches to different echo paths and combine their outputs constructively, a structure known as the RAKE receiver.

The RAKE receiver has several fingers, one for each echo path, and in each finger, the path delay with respect to some reference delay such as a direct or the earliest received path, must be estimated and tracked throughout the transmission. The estimation of the paths initial position in time is obtained by using a multi-path search algorithm. The multi-path search algorithm does an extensive search through correlators to locate the paths with a chip accuracy. After these initial positions are found, the tracking units generate accurate estimates for the delays of several multi-path components by means of early-late timing error detectors and utilize these estimates for the different delays to shift the phase of the codes. This type of tracking unit is known as an early-late gate synchronizer. A delay-locked loop (DLL) is commonly used to implement the early-late gate synchronizer. Illustrated in FIG. 1 is a block diagram of this delay-locked loop. The bandwidth of the Code Tracking Loop (CTL) determines the noise filtering capability of the synchronizer. The narrower the bandwidth, the more robust the synchronizer is to distortion from noise and less sensitive to small signal changes. The bandwidth of the loop depends on the parameters of the loop filter (alpha, beta), total loop gain ($K_T$), and input signal power level ($P_{in}$). Damping ratio of the loop also depends on the same parameters. Damping ratio of the loop determines the stability of the loop. Although the parameters of the loop can be fixed, it is very difficult to fix the input signal level.

Most of the digital receivers employ some form of Automatic Gain Control (AGC) in their physical layers. Although AGC limits the input signal level, the dynamic level of the signal level is still large. This is due to the fact that AGC is actually designed to prevent the Analog to Digital Converter (ADC) from entering saturation.

Since the dynamic range of the input signal level is not effectively limited, the bandwidth and damping ratio of the code tracking loop changes with input signal power. This results in degradation in performance for the code tracking loop.

Accordingly, there exists a need for a code tracking loop that maintains the bandwidth and damping ratio of the loop regardless of changes with the input signal power level.

Other objects and advantages of the present invention will become apparent after reading the description of the preferred embodiment.

SUMMARY

The present invention is a receiver, included in a user equipment (UE), of a code division multiple access (CDMA) communication system which includes the UE and a plurality of base stations. The UE is in communication with one of the plurality of base stations and receives a communication signal from the base station through the receiver. The communication signal is correlated by said receiver using a delay locked code tracking loop, that estimates and tracks a channel delay of the communication signal. The tracking loop comprises a reference code generator for generating a reference code signal and an interpolator for generating timed signal versions in response to the receipt of said communication. A timed signal correlator, also included in the track loop for correlating at least two of the timed signal versions with the code reference signal. The result of the correlation is used for generating an error signal. An automatic power normalization loop (APN), which is responsive to the interpolator, generates a power error signal that is used to normalize the error signal through a normalization circuit.

BRIEF DESCRIPTION OF THE DRAWING(S)

DETAILED DESCRIPTION OF THE PREFERRED EMBODIMENT(S)

Figure 1:
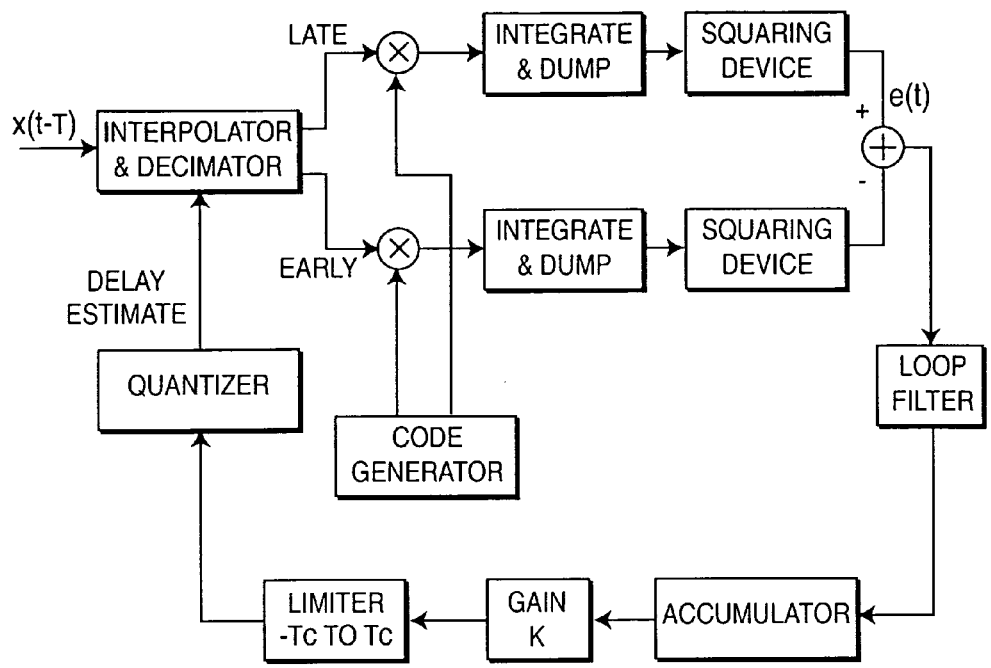
FIG. 1 is a block diagram of a prior art delay-locked tracking loop.

The preferred embodiment will be described with reference to the drawing figures wherein like numerals repeat like elements throughout.

Figure 2:
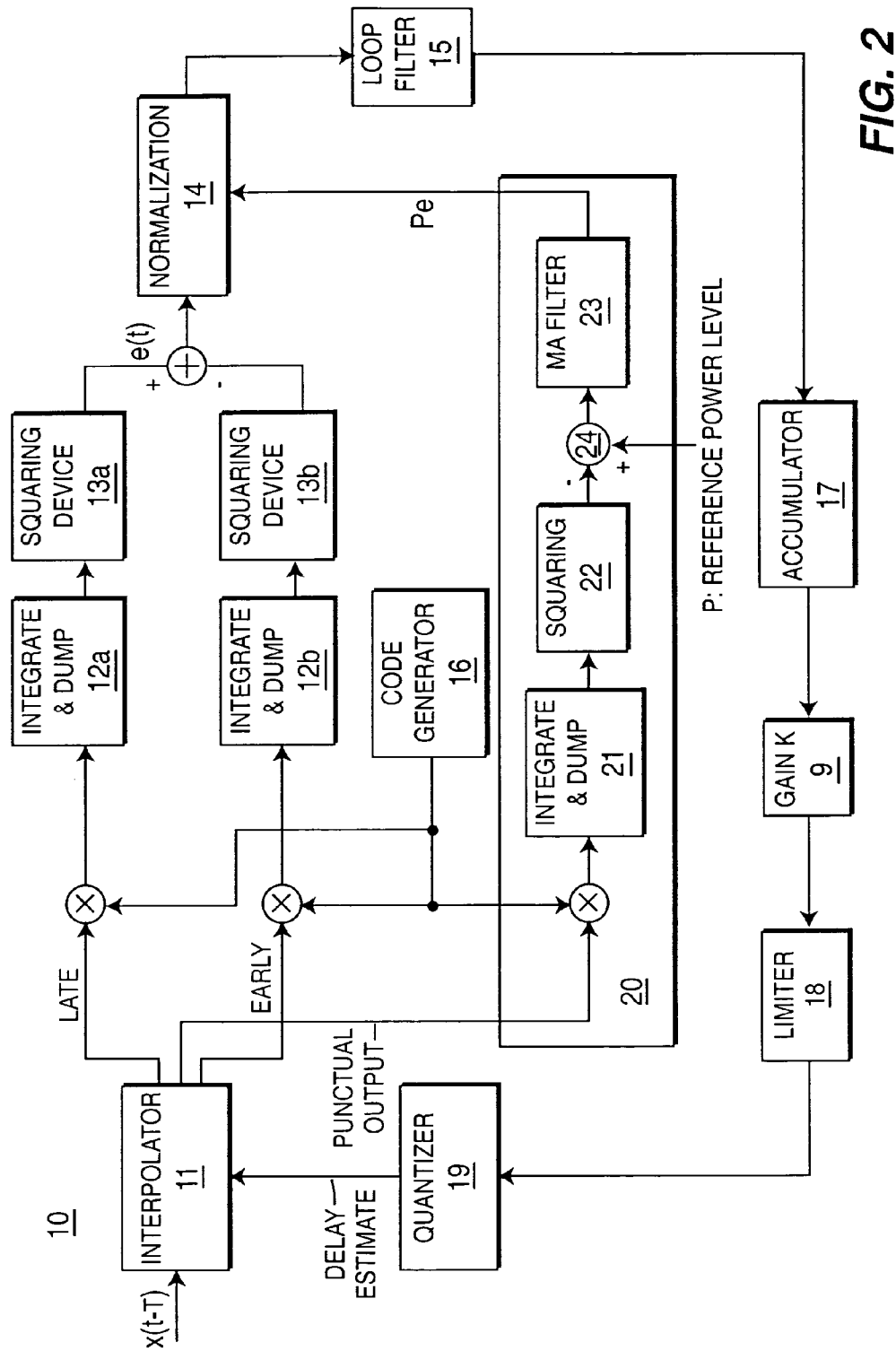
FIG. 2 is a block diagram of a delay-locked code tracking loop with automatic power normalization in accordance with the present invention.

Illustrated in FIG. 2 is a block diagram of the delay-locked code tracking loop (DCTL) 10 in accordance with the preferred embodiment of the present invention. The DCTL comprises an interpolator 11, two integrate and dump devices 12a, 12b, two squaring devices 13a, 13b, a normalization device 14, a loop filter 15, a code generator 16, an accumulator 17, a limiter 18, a quantizer 19, a gain circuit 9, and an automatic power normalization loop (APN) 20. The delay-lock code tracking loop 10 receives an input signal x (t−T), where T is the timing error in the received signal. Since the timing error is confined to −Tc to Tc, where Tc is the chip duration using the multi-path search algorithm, the only way to shift the incoming signal is by using mathematical interpolation. Accordingly, the interpolator 11, coupled to the integrate devices 12a, 12b, the code generator 16, and the APN 20, receives the input signal x (t−T) and creates three outputs: Punctual, Early and Late. As those skilled in the art know, the Early and Late outputs are a half chip early and a half chip late versions of the punctual output, respectively. They are all obtained by interpolation of the incoming signal x (t−T). After the interpolator 11, down-sampling takes place, all three outputs are preferably down-sampled by an over-sampling ratio of the transmitted signal. The punctual output is the main output of the DCTL 10, the early and late outputs are used only inside the code tracking loop 10 algorithm.

The early and late signals are correlated with the output of the reference code generator 16, such as a pilot code generator, in lower and upper branches of the DCTL using the integrate devices 12a, 12b, respectively. Once the outputs of the code generator 16 and the early and late outputs have been correlated, the correlated signals are forwarded to squaring devices 13a, 13b, respectively. Since phase synchronization is not acquired at this stage, squaring is used to obtain non-coherent CTL.

After correlation and squaring, the difference of the two branches (early and late) are taken to produce an error signal e(t), which is proportional to the timing error. The error signal e(t) is then power normalized against a power error signal ($P_e$) by the normalization circuit 14 (to be disclosed hereinafter) and output to the loop filter 15.

Figure 4:
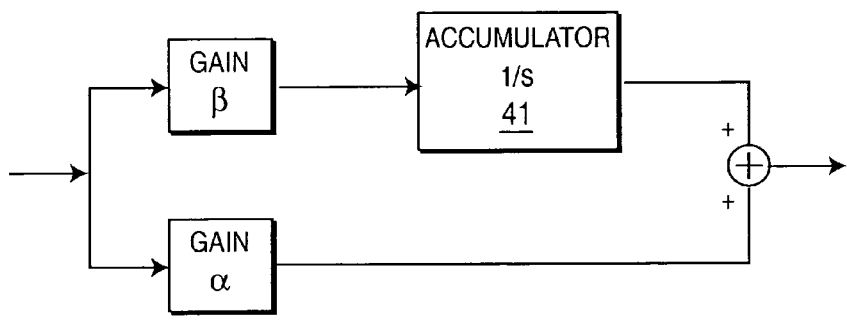
FIG. 4 is a block diagram of an exemplary loop filter included in the delay-locked tracking loop of the present invention.

The loop filter 15, coupled to the normalization device 14 and the accumulator 17, filters the normalized error signal e(t) and forwards it to the accumulator 17. An exemplary loop filter is a classical proportional integrator (PI) filter, but any first order low-pass filter would be appropriate for the present invention. The PI filter, including a loop filter accumulator 41, has two branches, as shown in FIG. 4. One branch creates a control signal proportional to the current value of the error signal and the other branch produces a signal proportional to the average value of the error signal. These signals are combined after being multiplied by two different constants, alpha and beta. The accumulator 41 inside the PI filter works exactly the same way as the accumulator 17 described below.

The accumulator 17, coupled to the loop filter and a gain circuit 9, receives the filtered error signal from the loop filter 15 and processes the signal. Those having skills in the art know that the accumulator 17 simply adds its current input to its previous output. Initially, the output of the accumulator 17 is set to zero. There is an overflow detection inside the accumulator to limit the output value. The accumulation by the accumulator 17 together with the loop filter 15 is used to obtain the second order feedback loop response. The accumulator 17 then forwards the error signal e(t) to the gain circuit 9.

The gain circuit 9, coupled to the accumulator 17 and a limiter circuit 18, receives the output of the accumulator 17 and adjust the level of the filtered signal to match the interpolator 11 timing shift value. This circuit changes the sign in the timing air signal to correct the timing delay/advance of the incoming signal reference to the code generator 16. Once this is accomplished, the gain circuit 9 forwards the adjusted error signal e(t) to a limiter circuit 18 that limits the over shoot of the error signal if it is above the chip duration −Tc to Tc. The limiter 18 forwards the error signal to the quantizer 19 where the discrete value of the delay estimate is obtained and forwarded back to the interpolator 11. In this design, a thirty-two (32) level quantizer is used to obtain an accuracy of Tc/16. Although any level of quantizer can be used for different levels of delay estimate accuracy DCTL is a second order feedback loop. In control system notation, the system function, H(s), for a second order feedback loop can be written as:

$$H(s) = \frac{2\zeta\omega_n s + \omega_n^2}{s^2 + 2\zeta\omega_n s + \omega_n^2}, \qquad \text{Equation (1)}$$

where $\zeta$ is the damping ratio and $\omega_n$ is the natural frequency of the system. These can be written in terms of the parameters of the DCTL as follows:

$$\omega_n = \sqrt{2\sqrt{P_{in}}\,K_T\beta}\,, \qquad \text{Equation (2)}$$

$$\zeta = \frac{K_T \alpha \sqrt{P_{in}}}{\omega_n}, \qquad \text{Equation (3)}$$

where alpha and beta are the loop filter parameters, $K_T = K_S K$ is the total open loop gain including the S-curve gain and the external gain, and $P_{in}$ is the input signal power. The two-sided noise bandwidth of the system is given by $$W_L = \omega_n\left(\zeta + \frac{1}{4\zeta}\right). \qquad \text{Equation (4)}$$

As an example, a Universal Mobile Telecommunications System (UMTS) Frequency Division Duplex (FDD) UE receiver design with a chip rate of 3.84 MHz and 2 times over-sampling use the following values: spreading factor of 256 for the pilot code, loop gain K=0.01, alpha=0.0141, and beta=0.00001. The values of natural frequency and damping ratio determine the main characteristics of the loop such as stability, gain and phase margins, bandwidth, convergence time, and steady state jitter. These characteristics are fixed during the design and should not change with respect to the input. Otherwise, the DCTL may malfunction and produce unexpected results. However, as seen from equations 2, 3, and 4, they all depend on input signal power, $P_{in}$, which may change considerably during the communication process.

In order to overcome the effects of the input signal x (t−T) power level changing, an Automatic Power Normalization loop 20 (APN) is included in the delay-locked tracking loop 10 of the present invention. The APN 20, coupled to the interpolator 11, the code generator 16 and the normalization circuit 11, comprises an integrate and dump circuit 21, a squaring device 22, an adder 24, and a moving average (MA) filter 23. The punctual output from the interpolator 11 is the input to the APN loop 20. The punctual signal is received by the integrate and dump circuit 21 along with the signal from the code generator 16. The integrate and dump circuit 21 is coupled to the code generator 16, the interpolator 11, and the squaring device 22. Similar to the integrate and dump circuits 12a, 12b disclosed above, the integrate and dump circuit 21 correlates the punctual signal received from the interpolator 11 with the signal received from the reference code generator 16. Once the two signals are correlated the integrate circuit 21 forwards the correlated signal to the squaring device 22.

The squaring device 22, coupled to the integrate circuit 21 and the adder 24, squares the correlated signal and forwards the squared signal to the adder 24. The adder 24 subtracts the squared output from the squaring device 22 from a reference signal power (P) the reference signal power (P) is a predetermined value and is used in the design of the DLL 10 to set the parameters. As those skilled in the art know, the reference power level (P) may be any predetermined value. The subtracting of the squared signal by the adder 24 results in a power difference signal, which is forwarded to the moving average filter 23.

The Moving Average (MA) filter 23, coupled to the adder 24 and the normalization circuit 14, receives the difference signal and filters it. The MA filter 23 consists of a real valued register of size N, an adder, and a constant multiplier with a factor of 1/N. Each time a new input is passed to the MA filter 23 the register elements are shifted one to the right. The element that came the earliest (on the right most side) is cleared and the current input value is placed in the left most place in the register. After this shift, each element in the register is added. The total value is multiplied by 1/N to produce the average value for the power error signal (Pe). It is preferable that N be selected to be twenty (20), which corresponds to 20 symbols processed. The MA filter size is selected such that it will be insensitive to instantaneous power changes due to fading, however it will compensate for the average input signal level changes. Once the MA filter 23 filters the power difference signal, a filtered power error signal $P_e$ is forwarded to the normalization circuit 14.

The normalization circuit 14, coupled to the squaring devices 13a, 13b and the APN 20, receives the error e(t) corresponding to the difference between the late and early outputs of the interpolator 11 and the power error signal $P_e$ from the APN 20. In order to normalize the error signal e(t) against the power error signal $P_e$, the normalization circuit 14 multiplies the error signal e(t) by (P/(P+$P_e$)), where P is the referenced signal power level used in the APN loop 20.

The normalization of the error signal instead of the input signal results in a reduced number of multiplications (normalization) by a factor equal to the spreading factor. Preferably, integrated into the normalization circuit there is a limiter (not shown) that limits the multiplication factor from 0.1 to 10 or −20 dB to 20 dB. This limiter is used to prevent noise amplification.

Figure 3:
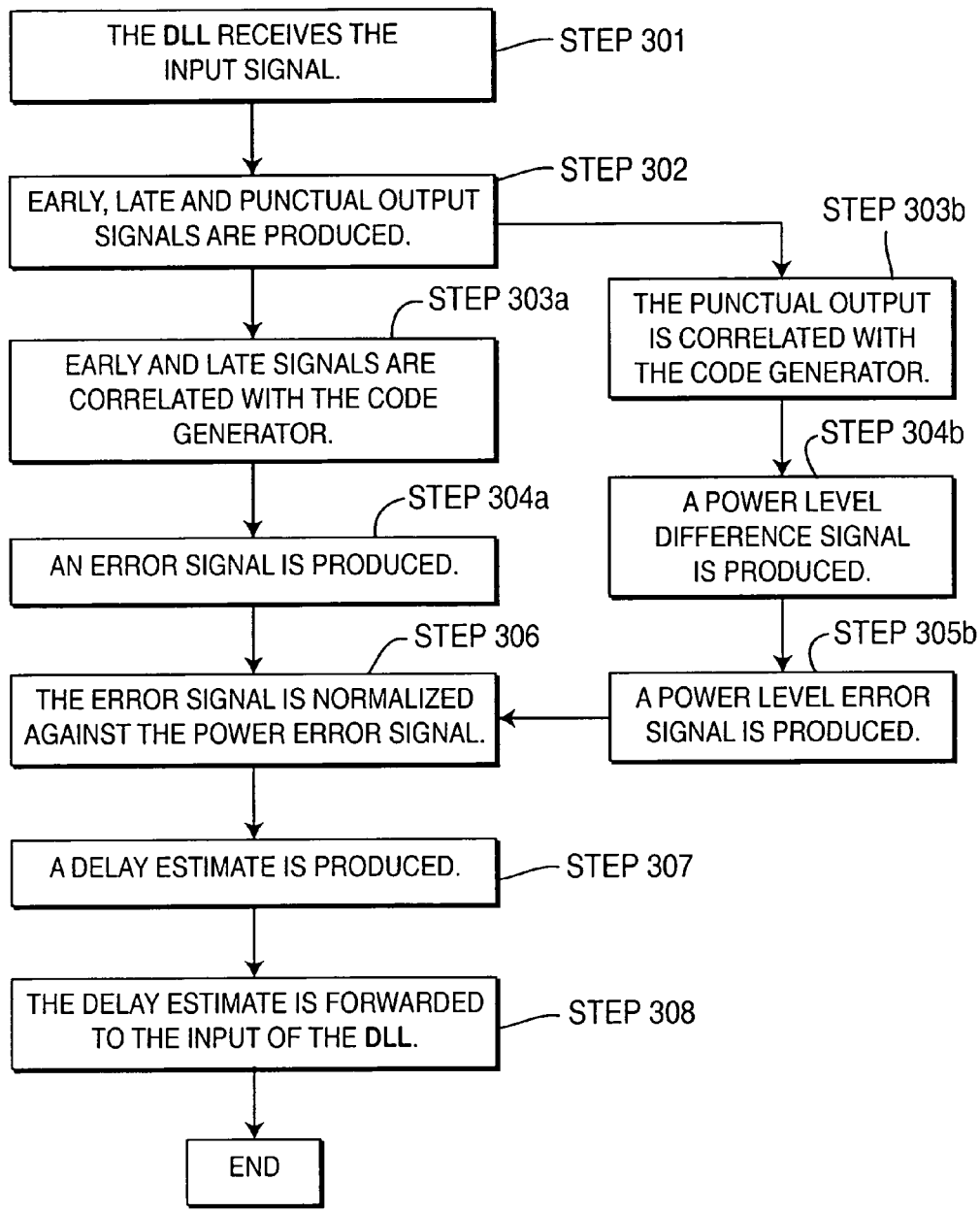
FIG. 3 is a flow diagram of the delay-locked code tracking loop of the present invention.

The flow diagram of the delay-lock code tracking loop in accordance with the preferred embodiment of the present invention is illustrated in FIG. 3. An input signal in received by the DLL circuit 10 (step 301). The interpolator 11 of the DLL circuit 10 produces the late, early and punctual outputs (step 302). The late and early outputs are correlated with the code generator 16 (step 303a), and the difference between the correlated signals is determined, producing an error signal e(t) (step 304a). Simultaneous to the late and early outputs, the punctual output is correlated with the code generator (step 303b) and subtracted from a predetermined reference power level to produce a power level difference signal (step 304b). The power level difference signal is then filtered to produce a power level error signal Pe (step 305b). The error signal corresponding to the late and early outputs, is normalized against the power level error signal Pe from the APN loop 20 (step 306). The normalized error signal is then processed to produce a delay estimate (step 307) which is forwarded back to the input of the DLL tracking loop 10 (step 308).

While the present invention has been described in terms of the preferred embodiment, other variations which are within the scope of the invention as outlined in the claims below will be apparent to those skilled in the art.

What is claimed is:

1. A delay-locked code tracking loop (DCTL) for use in a code division multiple access (CDMA) communication system, the DCTL for correlating a received communication signal to estimate and track a channel delay of said communication signal, the DCTL comprising:
   a reference code generator for generating a reference code signal;
   an interpolator for generating a punctual output signal, an early output signal and a late output signal;
   a first timed signal correlator for correlating said early output signal with said reference code signal to generate a first correlated signal;
   a second timed signal correlator for correlating said late output signal with said reference code signal to generate a second correlated signal;
   a third timed signal correlator for correlating said punctual output signal with said reference code signal to generate a third correlated signal;
   means for combining the first and second correlated signals to generate a first error signal;
   an automatic power normalization (APN) loop for generating a second error signal based on said third correlated signal; and
   a normalization circuit for normalizing said first error signal by using said second error signal to generate a third error signal used for controlling the generation of the punctual output signal by the interpolator.

2. The DCTL of claim 1 wherein said APN includes:
   an adder for subtracting said third correlated signal from a power reference signal, producing a power difference signal; and
   a filter, responsive to said adder, for filtering said power difference to generate said second error signal.

3. The DCTL of claim 2 further comprising:
   a loop filter, coupled to said normalization circuit, for filtering said third error signal;
   an accumulator, responsive to said loop filter, for accumulating said third error signal;
   a gain circuit, coupled to the accumulator, for changing the sign in said third error signal to correct a timing delay/advance of the received communication signal to the reference code signal; and
   a quantizer for generating a discrete value of the delay/advance for controlling the generation of the punctual output signal by the interpolator.

4. The DCTL of claim 3 wherein said early output signal is a half chip earlier than said punctual output signal and said late output signal is a half chip later than said punctual output signal.

5. In a code division multiple access (CDMA) communication system, a method for correlating a received communication signal to estimate and track a channel delay of said communication signal, the method comprising:
- generating a reference code signal;
- generating a punctual output signal;
- generating an early output signal;
- generating a late output signal;
- correlating said early output signal with said reference code signal to generate a first correlated signal;
- correlating said late output signal with said reference code signal to generate a second correlated signal;
- correlating said punctual output signal with said reference code signal to generate a third correlated signal;
- combining the first and second correlated signals to generate a first error signal;
- generating a second error signal based on said third correlated signal; and
- normalizing said first error signal by using said second error signal to generate a third error signal used for controlling the generation of the punctual output signal.

6. The method of claim 5 wherein said step of generating the second error signal further includes:
- subtracting said third correlated signal from a power reference signal, producing a power difference signal; and
- filtering said power difference to generate said second error signal.

7. The method of claim 6 further comprising the steps of:
- filtering said third error signal;
- accumulating said third error signal;
- changing the sign in said third error signal to correct a timing delay/advance of the received communication to said reference code signal; and
- generating a discrete value of the delay/advance for controlling the generation of the punctual output signal.

8. The method of claim 7 wherein said early output signal is a half chip earlier than said punctual output signal and said late output signal is a half chip later than said punctual output signal.

* * * * *

UNITED STATES PATENT AND TRADEMARK OFFICE
CERTIFICATE OF CORRECTION

PATENT NO.        : 7,010,020 B2                                          Page 1 of 1
APPLICATION NO. : 10/686057
DATED             : March 7, 2006
INVENTOR(S)       : Bultan et al.

It is certified that error appears in the above-identified patent and that said Letters Patent is hereby corrected as shown below:

ON THE TITLE PAGE item (56), OTHER PUBLICATIONS, page 2, left column, line 2, after the word "and", delete "Perfromance" and insert therefor --Performance--.

IN THE SPECIFICATION column 1, line 54, after the words "of the", delete "paths" and insert therefor --path's--.

column 4, line 8, after the word "and", delete "adjust" and insert therefor --adjusts--.

column 4, line 21, after the word "accuracy", insert --.--.

column 5, line 64, after the word "signal", delete "in" and insert therefor --is--.

IN THE CLAIMS claim 6, column 8, line 7, after the word "difference" insert --signal--.

Signed and Sealed this

Fourteenth Day of November, 2006

JON W. DUDAS
*Director of the United States Patent and Trademark Office*